United States Patent

Papa et al.

[11] 3,927,963
[45] Dec. 23, 1975

[54] HYDROSOLUBLE TRISAZOIC DYES, MIXTURES THEREOF, AND THE USE THEREOF

[75] Inventors: Sisto Papa, Milan; Ugo Moiso, Saronno (Varese); Renzo Ferrario, Ceriano Laghetto, (Milan), all of Italy

[73] Assignee: Aziende Colori Nazionali Affini ACNA S.p.A., Milan, Italy

[22] Filed: Apr. 1, 1974

[21] Appl. No.: 456,948

[30] Foreign Application Priority Data
Mar. 27, 1973 Italy .................................. 22204/73

[52] U.S. Cl. .................. 8/26; 260/173; 8/41 B; 8/51; 8/54; 8/94.1 R
[51] Int. Cl.² .................. C09B 27/00; C09B 45/48; C09B 31/16; C09B 33/18
[58] Field of Search .................................. 8/26

[56] References Cited
UNITED STATES PATENTS

| | | | |
|---|---|---|---|
| 2,073,000 | 3/1937 | Clingenstein ............... | 260/74 |
| 2,777,838 | 1/1957 | Huss et al. ................. | 260/168 |
| 3,030,352 | 4/1962 | Jirou et al. ................. | 260/145 |
| 3,325,467 | 6/1967 | Jirou et al. ................. | 260/145 |

FOREIGN PATENTS OR APPLICATIONS

| | | |
|---|---|---|
| 666,026 | 2/1952 | United Kingdom |
| 785,101 | 10/1957 | United Kingdom |
| 1,098,126 | 1/1968 | United Kingdom |
| 1,038,893 | 10/1953 | France |

*Primary Examiner*—Donald Levy
*Assistant Examiner*—A. L. Clingman
*Attorney, Agent, or Firm*—Hubbell, Cohen, & Stiefel

[57] ABSTRACT

The novel compound

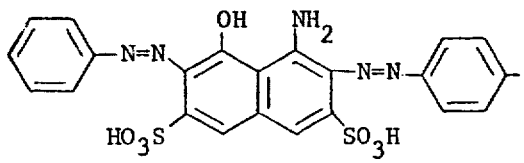

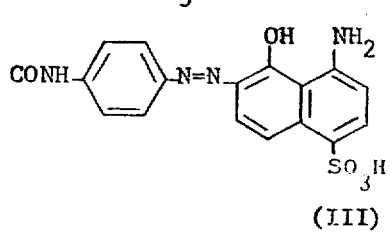

(III)

is a hydrosoluble dyestuff and when mixed, in an amount of 5–15% with 35–60% of each of the compounds:

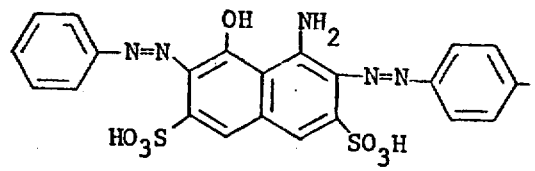

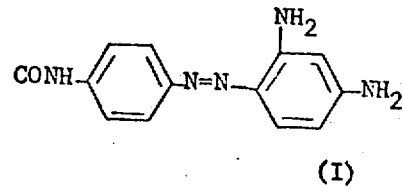

(I)

and

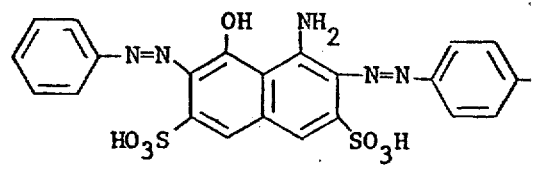

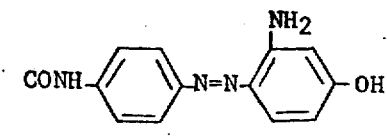

(II)

gives unusually good dyeings on cellulosic fibers, nitrogenous fibers and leather in black shades with reddish to greenish nuances.

4 Claims, No Drawings

HYDROSOLUBLE TRISAZOIC DYES, MIXTURES THEREOF AND THE USE THEREOF

CROSS REFERENCE TO RELATED APPLICATIONS

This application is related to copending application, Ser. No. 305,719, filed Nov. 13, 1972, and now abandoned the entire contents of which are expressly incorporated herein by reference.

BACKGROUND OF THE INVENTION

1. Field of the Invention

The present invention relates to mixtures of hydrosoluble trisazoic dyes particularly suited for being used in dyeing cellulosic fibers, nitrogenous fibers and leather in black shades having reddish to greenish nuances. The invention also relates to the use of these dyes in the dyeing of the above mentioned substrates.

2. Description of the Prior Art

In copending application Ser. No. 305,719, there are described dyes of the formulae:

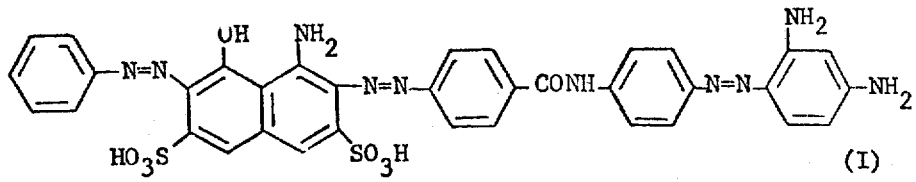

(I)

and

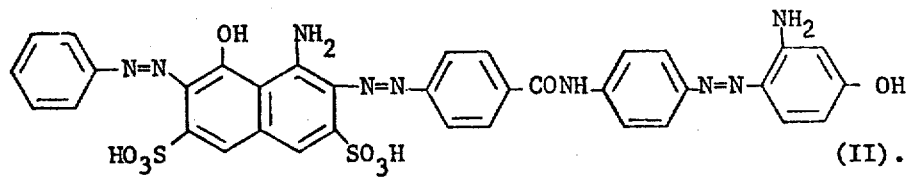

(II).

These dyes, either alone, or in mixtures having more than about 70% and more than about 50% respectively do not give entirely satisfactory dyeings. The unsatisfactory dyeings obtained with these dyes will be described in greater detail below. It is an object of this invention to overcome the disadvantages of said dyes.

SUMMARY OF THE INVENTION

The present invention provides, inter alia, dyeing mixtures consisting of mixtures of the following three compounds:

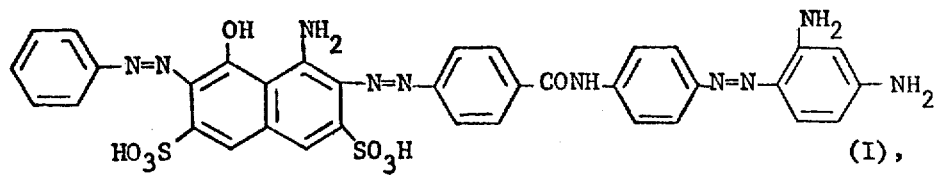

(I),

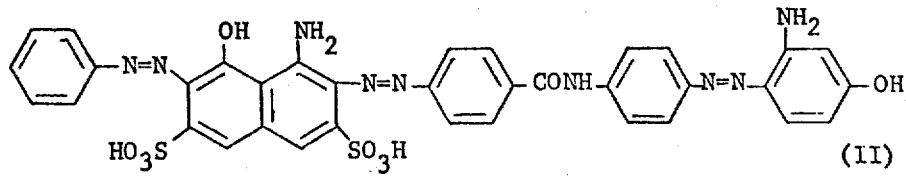

(II)

and

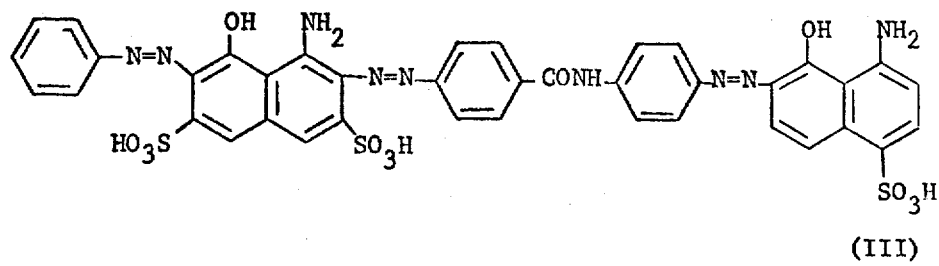

(III)

wherein the relative amounts of the three compounds vary within limited ranges.

While compounds (I) and (II) are described in application Ser. No. 305,719, compound (III) has not been previously described and is, per se, a further aspect of this invention. According to the invention, it has been found that mixtures of the above mentioned three compounds in the following proportions:

| Compound (I) | 35 – 60% |
| Compound (II) | 35 – 60% |
| Compound (III) | 5 – 15% | and preferably, mixtures consisting of 40–45% each of compounds (I) and (II), and of about 8–15% of compound (III), yield dyeings of a black shade, showing the optimum technical and commercial characteristics.

It was found that compound (I), either alone or in mixtures having more than about 70% of said compound gave good dyeings as far as hue and purity are concerned, but which were unstable to the attack of acid and alkaline agents, and above all to acid vapors. With respect to compound (II), either alone or in mixtures having more than about 50% of said compound, it was found that good dyeings were obtained as far as general fastness characteristics are concerned, but which showed a hue having a decidedly greenish flash which is unacceptable with regard to the presently prevailing technical and commercial requirements. Compound (III), although endowed with characteristics particularly suited for natural and synthetic polyamidic fibers, gives a violaceous black hue that makes this compound unsuitable for meeting present market requirements when used alone.

Moreover, the use, instead of compound (III), of other compounds of similar structure and hue, such as those obtained by substituting, for example, in the formula of compound (III), the 1-amino-8-naphthol-4-sulphonic acid moiety with the 2-amino-5-naphthol-6-sulphonic acid or the 2-amino-5-naphthol-7-sulphonic acid moieties, do not lead to the obtention of those dyeing characteristics needed for commercial applications.

The mixtures of dyes according to the invention may be obtained either by simply mixing together the three compounds (I), (II) and (III) in the above indicated ratios, or by a technically much easier and quicker method. This method comprises coupling the intermediate diazo-compound:

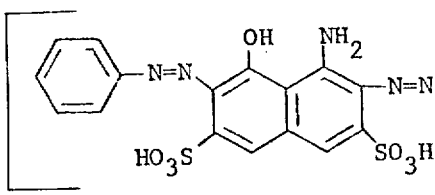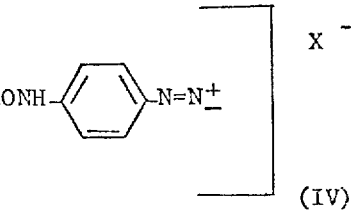

(IV)

wherein X⁻ is an anion, preferably the anion of an inorganic acid such as sulphuric or hydrochloric acid with the three coupling agents: m-phenylene-diamine, m-aminophenol and 1-amino-8-naphthol-4-sulphonic acid in the required stoichiometric ratios and following suitable reaction procedures.

The most preferred method comprises first coupling the diazo-compound (IV), at a pH of about 8.5 – 9, with a mixture of the two coupling agents: 1-amino-8-naphthol-4-sulphonic acid and m-aminophenol in the required ratios, and then, after adjusting the pH of the reaction mass to about 7, with m-phenylendiamine.

The new dye mixtures of the invention are excellent for dyeing cellulosic materials, natural and synthetic nitrogenous fibers such as cotton and regenerated cellulose, wool, half-wool, silk, nylon, leather and paper.

These novel mixtures allow one to create black shades of excellent applicative and general fastness characteristics which in particular enable one to substitute for the benzidinic Direct Black dye no. 38, C.I. 30,235, throughout the entire range of its applications.

The novel compound (III) may be obtained by coupling the diazo-compound (IV) with 1-amino-8-naphthol-4-sulphonic acid at a pH of about 8.5 – 9, at a temperature between 3° and 7°C.

DESCRIPTION OF THE PREFERRED EMBODIMENTS

The following examples will illustrate, without any limitation of the scope of the invention being intended thereby, the general aspects of the invention. All parts and percentages given are by weight, unless otherwise indicated.

EXAMPLE 1

22.7 parts of 4,4'-diamino-benzanilide, suspended in 30 parts of water, and 52 parts of hydrochloric acid of 20° Be, after being cooled by adding 150 parts of ice, were tetrazotized by dripping in, at 0° – 5°C, 14 parts of $NaNO_2$ in 60 parts of water. After stirring for 60 minutes, the excess nitrous acid was eliminated by adding sulphamic acid.

31 parts of 1-amino-8-oxynaphthalen-3,6-disulphonic acid in 100 parts of water and 13 parts of NaOH of 36° Be were dripped, over a 1 hour period onto the tetrazo solution, while keeping the temperature at between 2° – 5°C by means of ice, and maintaining the pH at 1.5 – 1.7.

The reaction mass was then kept under stirring for 16 – 18 hours, while allowing the temperature to rise to 10° – 15°C.

Separately, 8 parts of aniline dissolved in 60 parts of water and 23 parts of HCl 20° Be were diazotized with 6.0 parts of $NaNO_2$ in 25 parts of water. After 30 minutes of stirring, the excess nitrous acid was removed by adding sulphamic acid.

The solution of the diazotized aniline was poured over the mass of the previously obtained monoazoic product, and then cooled to 3° – 5°C with ice. Thereupon the pH was quickly raised to 8.5 – 8.7 by dripping onto it a 20% aqueous solution of $Na_2CO_3$.

After 20 hours at 3° – 5°C and with a pH of 8.5 – 8.7, there was observed only a trace of excess diazotized aniline.

Onto the whole mass, there was then rapidly discharged a solution of 2.38 parts of 1-amino-8-naphthol-4-sulphonic acid and 4.32 parts of m-aminophenol in 50 parts of water and 6.7 parts of NaOH 36° Be.

The mass was then stirred for 30 minutes at 5° – 7°C and at a pH of about 9. The pH was then adjusted to about 7 by adding 8 parts of HCl 20° Be and to the solution there were then added 4.32 parts of m-phenylendiamine in 20 parts of water.

The whole mass was then kept under stirring for at least 5 hours. At the end of the coupling the mass was acidified to Congo Red paper with 52 parts of HCl 20° Be. It was then heated to 80°C over a period of 45 minutes and maintained at this temperature for 45 minutes. Thereafter it was filtered under vacuum and then squeezed dry.

The thus obtained product, after being dried at 70° – required ratios, and then, after adjusting the pH of the losic and polyamide fibers to a full black hue of bright aspect and with a reddish tinge.

EXAMPLE 2

Following the procedures described in Example 1, but using instead of 2.38 parts of 1-amino-8-naphthol-4-sulphonic acid (a) and 4.32 parts of m-phenylenediamine (b), 1.905 parts of compound (a) and respectively 4.55 parts of compound (b), there was obtained a dye of similar characteristics to that of Example 1, but having a hue with more reddish flashes.

EXAMPLE 3

Preparation of Compound (III)

22.7 parts of 4,4'-diamino-benzanilide, suspended in 30 parts of water, and 52 parts of hydrochloric acid of 20° Be, after being cooled by adding 150 parts of ice, were tetrazotized by dripping in, at 0° – 5°C, 14 parts of $NaNO_2$ in 60 parts of water. After stirring for 60 minutes, the excess nitrous acid was eliminated by adding sulphamic acid.

31 parts of 1-amino-8-oxynaphthalen-3,6-disulphonic acid in 100 parts of water and 13 parts of NaOH of 36° Be were dripped, over a 1 hour period onto the tetrazo solution, while keeping the temperature at between 2° – 5°C by means of ice, and maintaining the pH at 1.5 – 1.7.

The reaction mass was then kept under stirring for 16 – 18 hours, while allowing the temperature to rise to 10° – 15°C.

Separately, 8 parts of aniline dissolved in 60 parts of water and 23 parts of HCl 20° Be were diazotized with 6.0 parts of $NaNO_2$ in 25 parts of water. After 30 minutes of stirring, the excess nitrous acid was removed by adding sulphamic acid.

The solution of the diazotized aniline was poured over the mass of the previously obtained monoazoic product, and then cooled to 3° – 5°C with ice. Thereupon the pH was quickly raised to 8.5 – 8.7 by dripping onto it a 20% aqueous solution of $Na_2CO_3$.

After 20 hours at 3° – 5°C and with a pH of 8.5 – 8.7, there was observed only a trace of excess diazotized aniline.

Onto the whole mass, there was then rapidly discharged a solution of 23.8 parts of 1-amino-8-naphthol-4-sulphonic acid dissolved in 100 parts of water and 12 parts of NaOH 36° Be. This mass was then kept under stirring for between 16 and 18 hours at a pH of about 9 and at a temperature of between 15° and 20°C.

EXAMPLE 4

0.3 part of the mixture of dyes prepared in Example 1 was dissolved in 200 parts of hot purified water, the solution then being placed into a suitable dyeing vessel.

Into this vessel there were then introduced 10 parts of a cotton yarn and heating was started, while subjecting the hank to stirring, until the temperature gradually reached 90°C. After 15 minutes from the time that this temperature was reached, there were introduced into the vessel 3 parts of $Na_2SO_4$, while still keeping the hank under stirring. The dyeing was carried on for a further 30 minutes after which the dyed material was extracted from the vessel and thoroughly washed in cold water and then dried. In this way a full black dyeing was obtained which had the characteristics described in Example 1.

Variations and modifications can, of course, be made without departing from the spirit and scope of the invention.

Having thus described our invention, what we desire to secure by Letters Patent and hereby claim is:

1. A mixture of hydrosoluble trisazo-dyes consisting of from 35–60% of a compound of the formula:

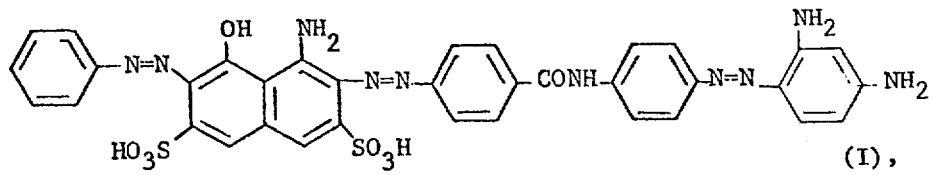

(I), from 35–60% of a compound of the formula:

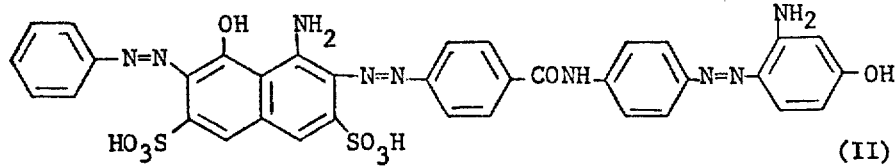

(II)

and from 5–15% of a compound of the formula:

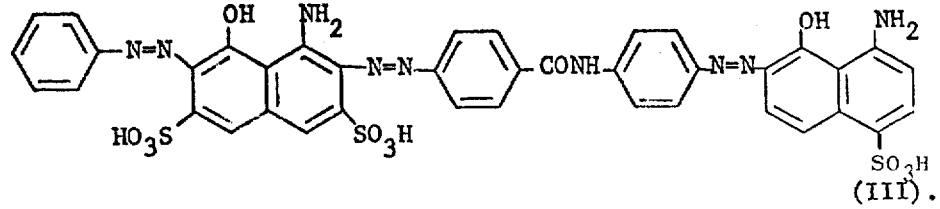

(III).

2. A mixture as claimed in claim 1 and consisting of:
40 – 45% of the compound of formula (I),
40 – 45% of the compound of formula (II) and
8 – 15% of the compound of formula (III).

3. A method comprising dyeing a natural or regenerated cellulosic fiber, or a natural or synthetic nitrogenous fiber with the mixture of hydrosoluble trisazo-dyes as claimed in claim 1.

4. Articles of cellulosic or nitrogenous fibers dyed or printed with the mixture of hydrosoluble trisazo-dyes of claim 1.

* * * * *

PO-1050
(5/69)

UNITED STATES PATENT OFFICE
CERTIFICATE OF CORRECTION

Patent No. 3,927,963                    Dated December 23, 1975

Inventor(s) SISTO SERGIO PAPA et al

It is certified that error appears in the above-identified patent and that said Letters Patent are hereby corrected as shown below:

Column 2, lines 4-5: "above mentioned substrates. above mentioned substrates." should read -- above mentioned substrates. --.

Column 5, lines 11-13: "70°- required ratios, and then, after adjusting the pH of the losic and polyamide fibers" should read -- 70°-80°C. for about 24 hours, is suitable for dyeing cellulosic and polyamide fibers --.

Signed and Sealed this

[SEAL]

twenty-ninth Day of June 1976

Attest:

RUTH C. MASON
*Attesting Officer*

C. MARSHALL DANN
*Commissioner of Patents and Trademarks*